(12) United States Patent
Nishi

(10) Patent No.: US 10,496,341 B2
(45) Date of Patent: Dec. 3, 2019

(54) IMAGE FORMING APPARATUS AND CONTROL METHOD

(71) Applicant: TOSHIBA TEC KABUSHIKI KAISHA, Shinagawa-ku, Tokyo (JP)

(72) Inventor: Takayuki Nishi, Fujisawa Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/028,991

(22) Filed: Jul. 6, 2018

(65) Prior Publication Data
US 2019/0196755 A1 Jun. 27, 2019

(30) Foreign Application Priority Data
Dec. 22, 2017 (JP) ................. 2017-246397

(51) Int. Cl.
| | |
|---|---|
| *G06F 3/12* | (2006.01) |
| *B41J 2/175* | (2006.01) |
| *G03G 15/08* | (2006.01) |
| *G03G 21/18* | (2006.01) |
| *G06F 21/31* | (2013.01) |
| *G06F 21/60* | (2013.01) |

(52) U.S. Cl.
CPC ........ *G06F 3/1217* (2013.01); *B41J 2/17546* (2013.01); *G03G 15/0863* (2013.01); *G03G 21/1892* (2013.01); *G06F 3/1219* (2013.01); *G06F 3/1239* (2013.01); *G06F 21/31* (2013.01); *G06F 21/608* (2013.01)

(58) Field of Classification Search
CPC combination set(s) only.
See application file for complete search history.

(56) References Cited

U.S. PATENT DOCUMENTS

| | | | | |
|---|---|---|---|---|
| 2013/0209131 A1* | 8/2013 | Uchitani | ............. | G03G 15/205 399/70 |
| 2013/0308167 A1* | 11/2013 | Nishiyama | ........... | H04N 1/4413 358/402 |
| 2014/0064766 A1 | 3/2014 | Saeki | | |
| 2016/0014286 A1 | 1/2016 | Kishida | | |
| 2016/0088094 A1* | 3/2016 | Kobayashi | ............ | H04L 67/143 709/224 |
| 2017/0225476 A1* | 8/2017 | Ness | .................... | B41J 2/17546 |
| 2017/0230540 A1* | 8/2017 | Sasaki | ................... | H04L 63/123 |
| 2018/0335991 A1* | 11/2018 | Takenaka | .............. | G06F 3/1238 |

FOREIGN PATENT DOCUMENTS

| | | |
|---|---|---|
| JP | 2015-191146 A | 11/2015 |
| JP | 2017-072749 A | 4/2017 |

OTHER PUBLICATIONS

Search Report dated Jul. 2, 2019 in corresponding European application No. 18 21 4585.4, 7 pages.

\* cited by examiner

*Primary Examiner* — Helen Zong
(74) *Attorney, Agent, or Firm* — Foley & Lardner LLP

(57) ABSTRACT

An image forming apparatus includes an authentication section configured to execute an authentication process on a replacement part; and a controller configured to skip the authentication process when determining that a stop period from the start of operation stop to the end or the operation stop is equal to or shorter than a predetermined period of time, and to execute the authentication process when determining that the stop period exceeds the predetermined period of time.

13 Claims, 8 Drawing Sheets

IMAGE FORMING APPARATUS AND CONTROL METHOD

CROSS-REFERENCE TO RELATED APPLICATION

This application is based upon and claims the benefit of priority from Japanese Patent Application No. 2017-246397, filed Dec. 22, 2017, the entire contents of which are incorporated herein by reference.

FIELD

Embodiments described herein relate generally to an image forming apparatus and a control method.

BACKGROUND

There is known an image forming apparatus which performs an authentication process for determining whether or not a mounted toner cartridge is a standard toner cartridge. Such an image forming apparatus performs the authentication process when a toner cartridge is replaced, when a power supply thereof is turned on, and when waking up from the sleep mode. However, there is a case in which more time is taken until the image forming apparatus to become usable due to execution of the authentication process.

DETAILED DESCRIPTION

In accordance with at least one embodiment, an image forming apparatus comprises an authentication section configured to execute an authentication process on a replacement part; and a control section configured to skip the authentication process if determining that a stop period from the start of operation stop to the end of the operation stop is equal to or shorter than a predetermined period of time, and execute the authentication process if determining that the stop period exceeds the predetermined period of time.

Hereinafter, an image forming apparatus according to some embodiments will be described with reference to the accompanying drawings.

(First Embodiment)

Figure 1:
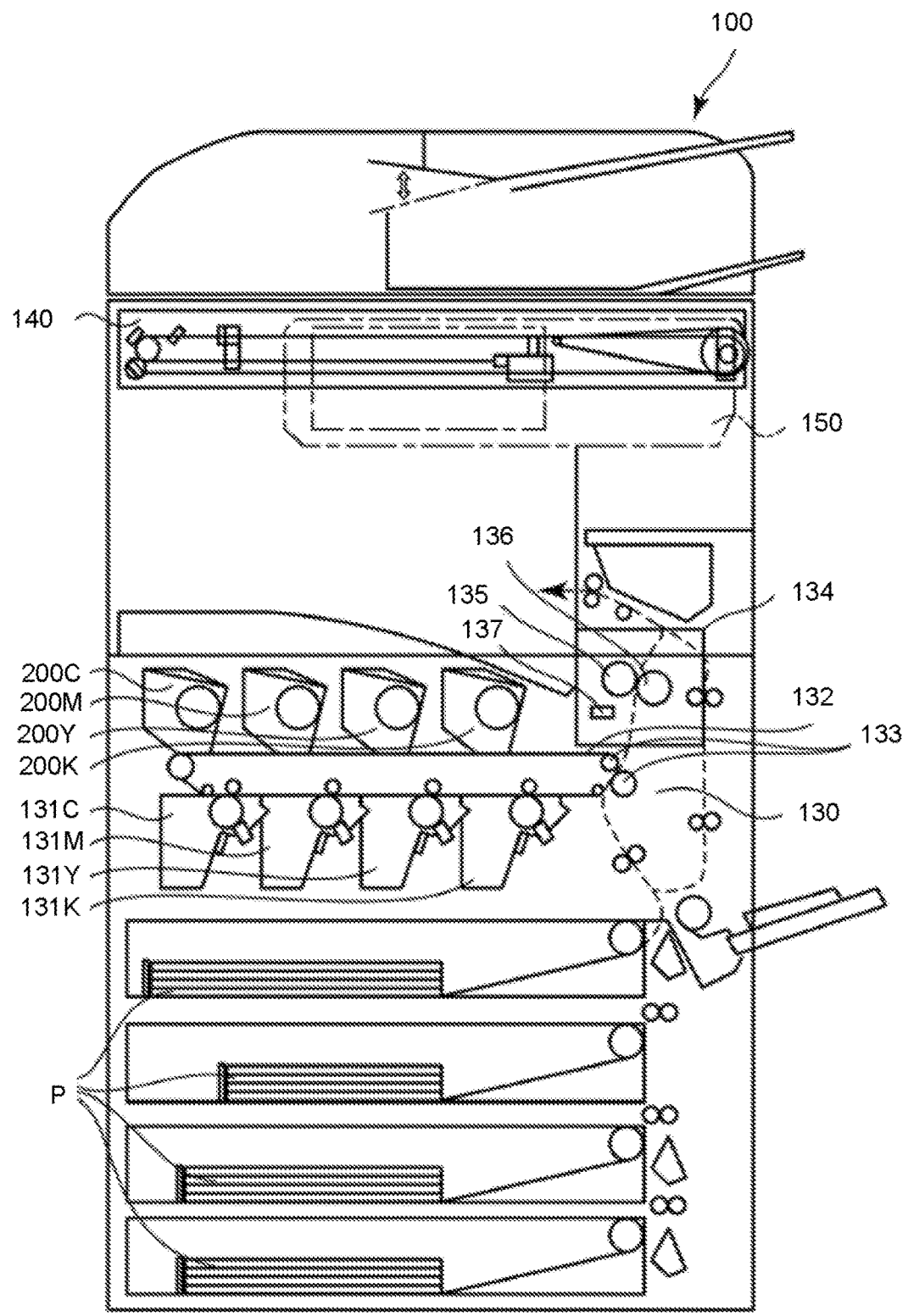
FIG. 1 is a schematic diagram illustrating an outline of an image forming apparatus according to a first embodiment and a second embodiment.

FIG. 1 is a schematic diagram illustrating an outline of an image forming apparatus 100 according to a first embodiment.

Figure 2:
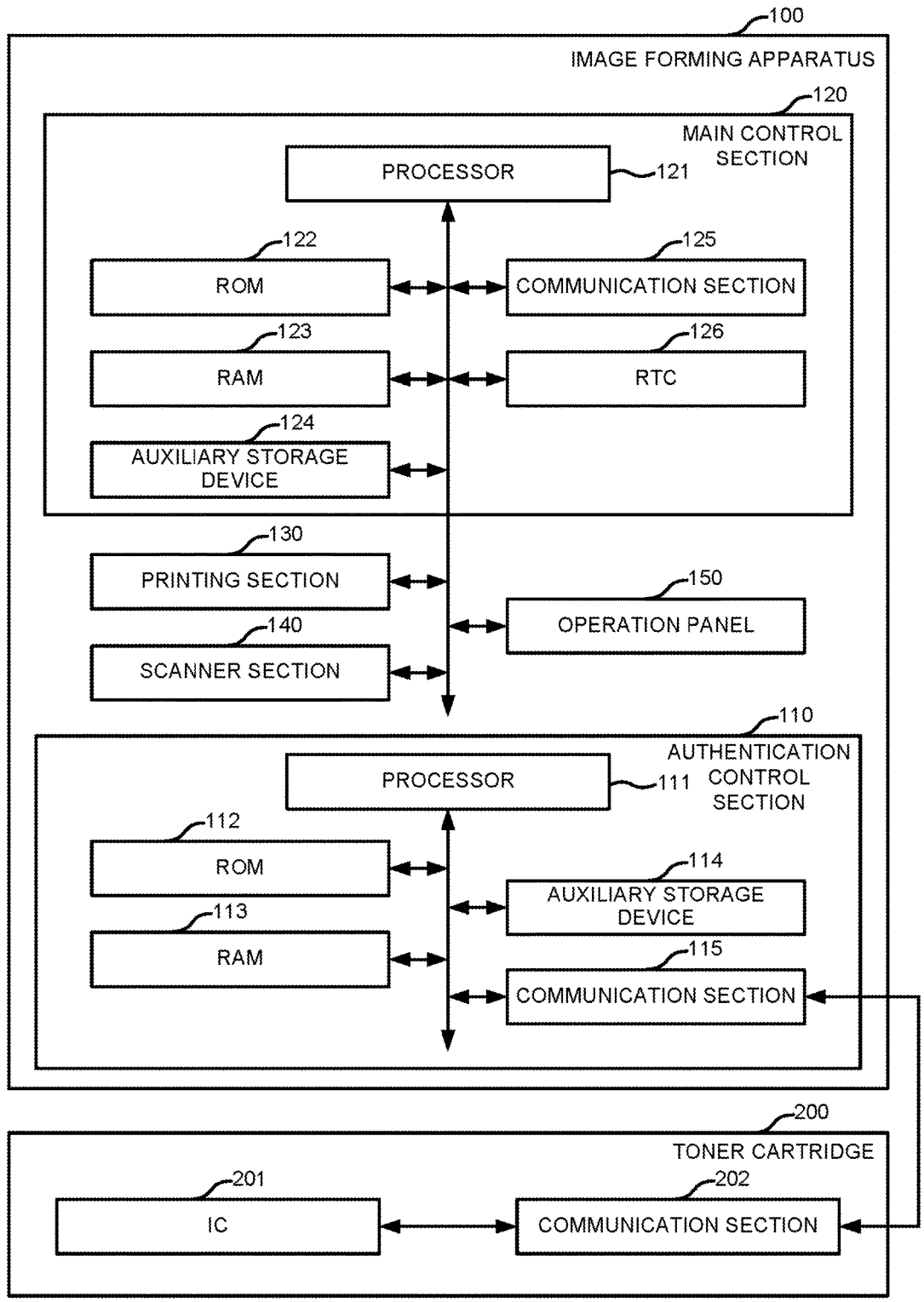
FIG. 2 is a block diagram illustrating a circuit configuration of main portions of the image forming apparatus and a toner cartridge according to the first to fourth embodiments.

FIG. 2 is a block diagram illustrating an example of a circuit configuration of main portions of the image forming apparatus 100 and a toner cartridge 200 according to the first embodiment.

The image forming apparatus 100 has a printing function of forming an image on an image forming medium P using a recording material such as a toner. The image forming medium P may be, for example, a sheet-like paper. The image forming apparatus 100 has a scanning function of reading an image from a document on which the image is formed. Furthermore, the image forming apparatus 100 has a copying function of printing the image read from the document by the scanning function on the image forming medium P. The image forming apparatus 100 further includes a facsimile function. A toner cartridge 200 can be mounted in the image forming apparatus 100.

The image forming apparatus 100 is a MFP (Multi-Function Peripheral), a copy machine, a printer, a facsimile, or the like. The image forming apparatus 100 includes an authentication control section 110, a main control section 120, a printing section 130, a scanner section 140 and an operation panel 150, for example.

The authentication control section 110 controls an authentication process on the toner cartridge 300. The authentication control section 110 performs the authentication process on the toner cartridge 200 by communicating with an IC 201. The authentication control section 110 includes a processor 111, a ROM (Read-only Memory) 112, a RAM (Random Access Memory) 113, an auxiliary storage device 114 and a communication section 115, for example. The authentication control section 110 is an example of an authentication section that performs the authentication process on the toner cartridge 200.

The processor 111 acts as a central part of a computer which performs processes such as an arithmetic process and a control process necessary for the operation of the authentication control section 110. The processor 111 may execute a program such as a system software, an application software or a firmware stored in the ROM 112 or the auxiliary storage device 114 to control each section to realize various functions of the authentication control section 110. The processor 111 is, for example, a CPU (Central Processing Unit), a MPU (Micro Processing Unit), a SoC (System on a Chip), a DSP (Digital Signal Processor), a GPU (Graphics Processing Unit), an ASIC (Application Specific Integrated Circuit), a PLD (Programmable Logic Device) or a FPGA (Field-Programmable Gate Array). Alternatively, the processor 111 may be a combination of those. The processor 111 is an example of the authentication section. The computer with the processor 111 as the central part is an example of the authentication section.

The ROM 112 acts as a main storage device of the computer with the processor 111 as the central part. The ROM 112 is a nonvolatile memory exclusively used for reading data. The ROM 112 stores the above program. The ROM 112 stores data used for the processor 111 to perform various processes or various setting values.

The RAM 113 acts as a main storage device of the computer with the processor 111 as the central part. The RAM 113 is a memory used for reading and writing data. The RAM 113 is used as a so-called work area for storing data temporarily used for the processor 111 to perform various processes.

The auxiliary storage device 114 acts as an auxiliary storage device of the computer with the processor 111 as the central part. The auxiliary storage device 114 is, for example, an EEPROM (Electric Erasable Programmable Read-Only Memory), a HDD (Hard Disk Drive), a SSD (Solid State Drive), or the like. The auxiliary storage device 114 may store the above program. The auxiliary storage device 114 stores data used by the processor 111 to perform various processes, data generated by processes by the processor 111, or various setting values.

The program stored in the ROM 112 or the auxiliary storage device 114 includes a program for executing processes described later. As an example, the authentication control section 110 is transferred to an administrator or the like of the authentication control section 110 with the program stored in the ROM 112 or the auxiliary storage device 114. However, the authentication control section 110 may be transferred to the administrator or the like in a state in which the program is not stored in the ROM 112 or the auxiliary storage device 114. The authentication control section 110 may be transferred to the administrator or the like with another program different from the above program stored in the ROM 112 or the auxiliary storage device 114. Then, the program for executing the processes described later may be separately transferred to the administrator or the like, and may be written into the ROM 112 or the auxiliary storage device 114 under the operation of the administrator or a service person. The transfer of the program at this time may be realized by recording the program on a removable storage medium such as a magnetic disk, a magneto-optical disk, an optical disk, a semiconductor memory or the like, or by downloading the program via a network.

The communication section 115 is used for communicating with the toner cartridge 200. The communication with the toner cartridge 200 may be performed in a wired manner or in a wireless manner such as a non-contact communication.

The main control section 120 controls the image forming apparatus 100. The main control section 120 includes a processor 121, a ROM 122, a RAM 123, an auxiliary storage device 124, a communication section 125 and an RTC 126, for example.

The processor 121 acts as a central part of a computer which performs processes such as an arithmetic process and a control process necessary for the operation of the image forming apparatus 100. The processor 121 executes a program such as a system software, an application software or a firmware stored in the ROM 122 or the auxiliary storage device 124 to control each section to realize various functions of the image forming apparatus 100. The processor 121 is, for example, a CPU, a MPU, a SoC, a DSP, a GPU, an ASIC, a PLD or a FPGA. Alternatively, the processor 121 may be a combination of those.

The ROM 122 acts as a main storage device of the computer with the processor 121 as the central part. The ROM 122 is a nonvolatile memory exclusively used for reading data. The ROM 122 stores the above program. The ROM 122 stores data used for the processor 121 to perform various processes or various setting values.

The RAM 123 acts as a main storage device of the computer with the processor 121 as the central part. The RAM 123 is a memory used for reading and writing data. The RAM 123 is used as a so-called working area for storing data temporarily used for the processor 121 to perform various processes.

The auxiliary storage device 124 acts as an auxiliary storage device of the computer with the processor 121 as the central part. The auxiliary storage device 124 is, for example, an EEPROM, a HDD, a SSD, or the like. The auxiliary storage device 124 may store the above program. The auxiliary storage device 124 stores data used by the processor 121 to perform various processes, data generated by the processes by the processor 121, or various setting values.

The program stored in the ROM 122 or the auxiliary storage device 124 includes a program for executing processes described later. As an example, the main control section 120 is transferred to an administrator or the like of the main control section 120 with the program stored in the ROM 122 or the auxiliary storage device 124. However, the main control section 120 may be transferred to the administrator or the like in a state in which the program is not stored in the ROM 122 or the auxiliary storage device 124. The main control section 120 may be transferred to the administrator or the like with another program different from the above program stored in the ROM 122 or the auxiliary storage device 124. Then, the program for executing the processes described later may be separately transferred to the administrator or the like, and may be written into the ROM 122 or the auxiliary storage device 124 under the operation of the administrator or a service person. The transfer of the program at this time may be realized by recording the program on a removable storage medium such as a magnetic disk, a magneto-optical disk, an optical disk, a semiconductor memory or the like, or by downloading the program via the network.

The communication section 125 is used for the image forming apparatus 100 to communicate with a PC (Personal Computer), a server, a smart phone, or the like via a communication path such as a LAN (local area network), the Internet, or a public switched telephone network.

The RTC (real-time clock) 126 is a clock for measuring system time.

The printing section 130 forms an image using a toner or the like on the image forming medium P conveyed from a sheet feed cassette or a manual feed tray. In other words, the printing section 130 prints an image on the image forming medium P. The printing section 130 is, for example, a laser printer. The printing section 130 includes an image forming section 131, a transfer belt 132, a transfer roller 133, a fixing section 134, a heat roller 135 and a pressure roller 136, for example.

The image forming apparatus 100 includes one or more image forming sections 131. As shown in FIG. 1, the image forming apparatus 100 includes four image forming sections 131, i.e., an image forming section 131C, an image forming section 131M, an image forming section 131Y, and an image forming section 131K. The image forming section 131C, the image forming section 131M, the image forming section 131Y and the image forming section 131K correspond to respective colors of CMYK (cyan, magenta, yellow, and key (black)). Specifically, the image forming section 131C corresponds to cyan, the image forming section 131M corresponds to magenta, the image forming section 131Y corresponds to yellow, and the image forming section 131K corresponds to black.

The image forming sections 131 forms images to be transferred onto the image forming medium P using recording material of respective corresponding colors. The image forming sections 131 transfer images formed with the recording material of respective corresponding colors onto the transfer belt 132.

The transfer belt 132 is, for example, an endless belt and is rotatable by the rotation of rollers. The transfer belt 132 rotates to convey the images transferred from the image forming sections 131 to a position of the transfer roller 133.

The transfer roller 133 includes two rollers facing each other. The transfer roller 133 rotates by the operation of a motor to transfer the image formed on the transfer belt 132 onto the image forming medium P.

The fixing section 134 heats and pressurizes the image forming medium P onto which the image is transferred. As a result, the image transferred onto the image forming medium P is fixed. The fixing section 134 includes a heat roller 135 and a pressure roller 136 facing each other.

The heat roller 135 has a heat source for heating the heat roller 135. The heat source is, for example, a heater. The heat roller 135 includes a thermometer 137.

The thermometer 137 measures the temperature of the fixing section 134. For example, the thermometer 137 measures the temperature of the heat roller 135 or the temperature around the heat roller 135. The thermometer 137 outputs the measured temperature.

The pressure roller 136 pressurizes the image forming medium passing between the pressure roller 136 and the heat roller 135.

The scanner section 140 reads an image from a document. The scanner section 140 includes a scanner for reading the image from the document.

The scanner may be an optical reduction system including an image capturing element such as a CCD (Charge-Coupled Device) image sensor, for example. Alternatively, the scanner may be a contact sensor (CIS (contact image sensor)) system including an image capturing element such as a CMOS (complementary metal-oxide-semiconductor) image sensor. Alternatively, the scanner may be another known system.

The operation panel 150 includes buttons and a touch panel for an operator of the image forming apparatus 100 to operate. The buttons and the touch panel of the operation panel 150 function as an input device for receiving an operation by the operator of the image forming apparatus 100. The touch panel of the operation panel 150 functions as a display device for notifying the operator of the image forming apparatus 100 of various information.

The toner cartridge 200 stores a recording material such as the toner. One or more toner cartridges 200 can be mounted in the image forming apparatus 100. As shown in FIG. 1, for example, four toner cartridges 200, i.e., a toner cartridge 200C, a toner cartridge 200M, a toner cartridge 200Y, and a toner cartridge 200K are mounted in the image forming apparatus 100. The toner cartridge 200C, the toner cartridge 200M, the toner cartridge 200Y, and the toner cartridge 200K each store a recording material corresponding to each color of CMYK. Specifically, the toner cartridge 200C corresponds to cyan, the toner cartridge 200M corresponds to magenta, the toner cartridge 200Y corresponds to yellow, and the toner cartridge 200K corresponds to black. The recording material stored in the toner cartridge 200 is supplied to the image forming section 131 of the corresponding color.

The toner cartridge 200 includes, for example, an IC (integrated circuit) 201 and a communication section 202.

The toner cartridge 200 is an example of a replacement part.

The IC 201 is an integrated circuit used by the image forming apparatus 100 to authenticate the toner cartridge 200. The IC 201 stores the authentication information used for the authentication process. The IC 201 performs calculation necessary for the authentication process. The IC 201 measures an amount of the recording material stored in the toner cartridge 200. Then, the IC 201 transmits the measured amount of the recording material to the image forming apparatus 100 through the communication section 202. Furthermore, the IC 201 transmits various information relating to the toner cartridge 200 to the image forming apparatus 100 through the communication section 202.

The communication section 202 is an interface through which the IC 201 communicates with the image forming apparatus 100.

Figure 3:
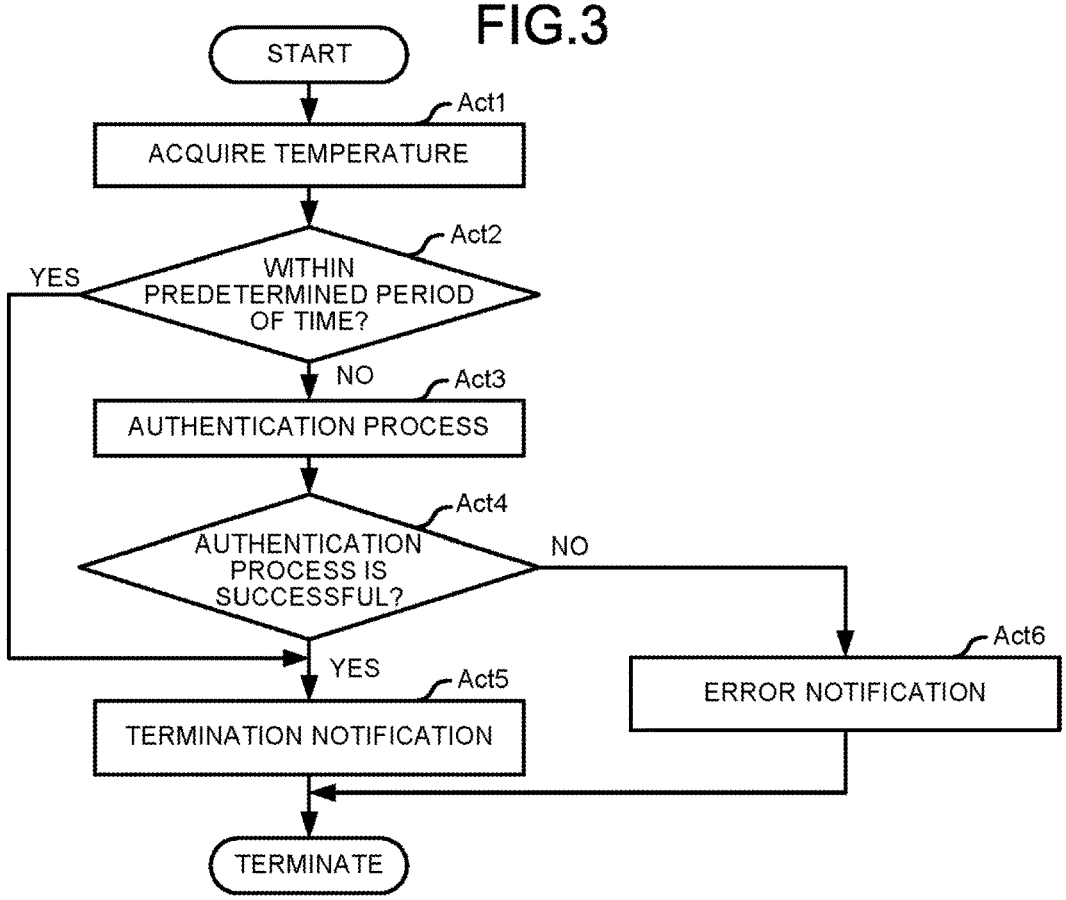
FIG. 3 is a flowchart for depicting a process by a processor of an authentication control section in FIG. 2 according to the first embodiment.
Figure 4:
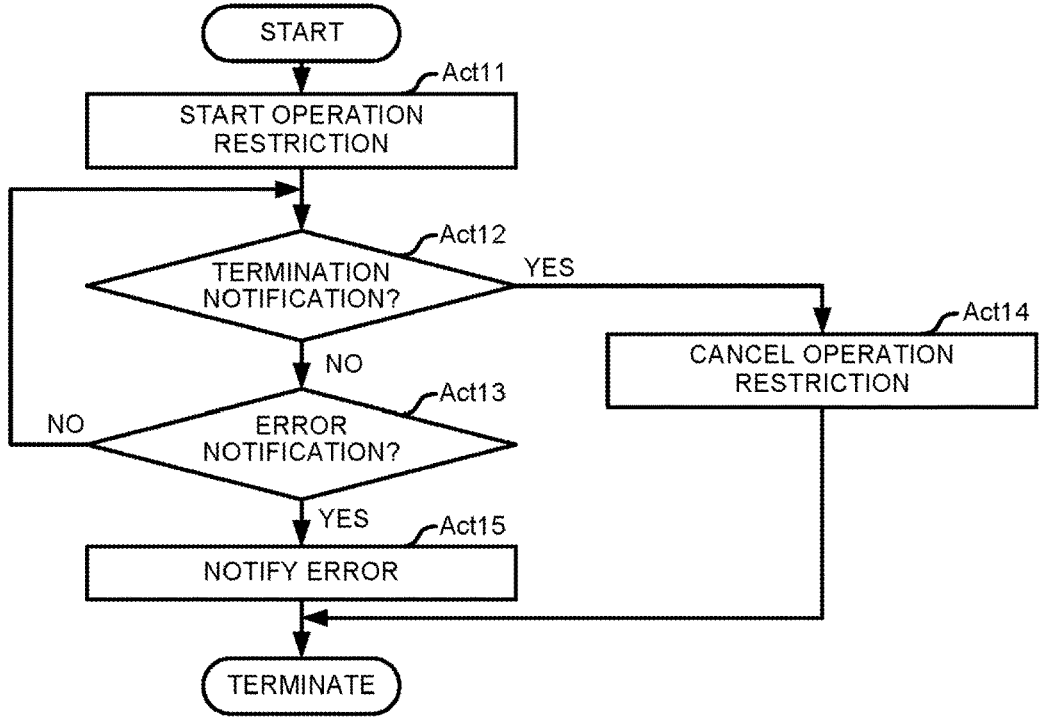
FIG. 4 is a flowchart for depicting a process by a processor of a main control section in FIG. 2 according to the first to third embodiments.

Below, the operation of the image forming apparatus 100 according to the first embodiment is described with reference to FIG. 3 and FIG. 4. The content of the process in the following operation description is merely an example, and various processes capable of achieving the same result can be suitably used. FIG. 3 is a flowchart for depicting the process by the processor 111 of the authentication control section 110. The processor 111 executes the process by executing the program stored in the ROM 112 or the auxiliary storage device 111. FIG. 4 is a flowchart for depicting the process by the processor 121 of the main control section 120. The processor 121 executes the process by executing the program stored in the ROM 122 or the auxiliary storage device 124. Unless there is specific description, it is assumed that the processor 111 and the processor 121 proceed to the process in Act (N+1) after the process in Act N (N is a natural number).

The image forming apparatus 100 can operate in a mode called a sleep mode or the like. For example, if there is no input such as operation and communication for a predetermined period of time, the image forming apparatus 100 shifts to the sleep mode. The image forming apparatus 100 in the sleep mode reduces the power consumption by stopping the operation of each section. The image forming apparatus 100 in the sleep mode stops the heating by the heat roller 135. The image forming apparatus 100 cancels the sleep mode and shifts to a normal operation mode if there is an operation on the operation panel 150 or the communication with the communication section 125 in the sleep mode. The transition from the sleep mode to the normal mode is performed under the control of the main control section 120.

If the image forming apparatus 100 enters a power-on state from a power-off state, the image forming apparatus 100 starts the operation of each section under the control of the main control section 120.

The processor 111 of the authentication control section 110 starts the process shown in FIG. 3 in response to cancellation of the sleep mode of the image forming apparatus 100. The processor 111 also starts the process shown in FIG. 3 even if the image forming apparatus 100 shifts from the power-off state to the power-on state.

In Act 1, the processor 111 acquires the temperature output by the thermometer 137.

In Act 2, the processor 111 determines whether or not a length of a period until the sleep mode is cancelled since the image forming apparatus 100 shifts to the sleep mode, or a length of a period until the power is turned on next time since the power supply of the image forming apparatus 100 is turned on is equal to or shorter than a threshold value A. Hereinafter, "the period until the sleep mode is cancelled since the transition to the sleep mode, or the period until the power is turned on next time since the power supply is turned on" is referred to as a "stop period". The processor 111 determines whether or not the length of the stop period is equal to or shorter than the threshold value A as follows. The heat roller 135 is heated to a predetermined temperature while the image forming apparatus 100 is in operation. Then, the heat roller 135 stops heating while the image forming apparatus 100 is in the stop period. Therefore, during the stop period, the temperature of the heat roller 135 and the temperature around the heat roller 135 gradually decrease. Therefore, the temperature output by the thermometer 137 at the end of the stop period becomes lower as the stop period becomes longer. By using this, the processor 111 determines that the length of the stop period is equal to or shorter than the threshold value A if the temperature acquired in Act 1 is equal to or higher than a threshold value B. On the other hand, if the temperature acquired in Act 1 is lower than the threshold value B, the processor 111 determines that the length of the stop period exceeds the threshold value A. If the processor 111 determines that the length of the stop period exceeds the threshold value A, the processor 111 determines No in Act 2 and proceeds to the process in Act 3.

The threshold value A is determined in advance by a designer or a seller of the image forming apparatus 100.

The threshold value B is derived, for example, using a function of the threshold value A. Alternatively, the threshold value B is predetermined by the designer or the seller of the image forming apparatus 100.

When the image forming apparatus 100 is in the sleep mode and when the power supply thereof is turned off, it can be said that the image forming apparatus 100 is in an operation stop state. Therefore, the transition of the image forming apparatus 100 to the sleep mode is an example of the start of the operation stop. Turning off the power supply of the image forming apparatus 100 is an example of the start of the operation stop. The cancellation of the sleep mode of the image forming apparatus 100 is an example of the end of the operation stop. Turning on the power supply of the image forming apparatus 100 is an example of the end of the operation stop.

In Act 3, the processor 111 performs the authentication process on each toner cartridge 200. The authentication process is a process of confirming that the toner cartridge 200 is standard. The processor 111 can use well-known methods for the authentication process. Therefore, a detailed description of the authentication process is omitted.

From the above, by executing the process in Act 3, the computer having the processor 111 as the central part functions as the authentication section for executing the authentication process on the toner cartridge 200. By performing the process in Act 3, the authentication control section 110 functions as the authentication section for executing the authentication process on the toner cartridge 200.

In Act 4, the processor 111 determines whether or not the authentication of all the four toner cartridges 200 is successful according to the authentication process in Act 3.

If the authentication of all the toner cartridges 200 is successful, the processor 111 determines Yes in Act 4 and proceeds to the process in Act 5. If the processor 111 determines that the length of the stop period is equal to or shorter than the threshold value A, the processor 111 determines Yes in Act 2 and proceeds to the process in Act 5.

In Act 5, the processor 111 generates a termination notification and transmits it to the main control section 120. The termination notification indicates that the authentication of all the four toner cartridges 200 is successful, or that the authentication process is skipped. The termination notification is received by the processor 121 of the main control section 120. After terminating the processing in Act 5, the processor 111 terminates the processing shown in FIG. 3.

On the other hand, the processor 121 of the main control section 120 starts the process shown in FIG. 4 in response to the cancellation of the sleep mode of the image forming apparatus 100. The processor 121 also starts the process shown in FIG. 4 if the image forming apparatus 100 shifts from the power-off state to the power-on state.

In Act 11 in FIG. 4, the processor 121 starts an operation restriction for preventing operations such as the printing function, the scanning function, the copy function, and the like from being started until the authentication process is terminated.

In Act 12, the processor 121 determines whether or not the termination notification is received. If the termination notification is not received, the processor 121 determines No in Act 12 and proceeds to the process in Act 13.

In Act 13, the processor 121 determines whether or not an error notification is received. If the error notification is not received, the processor 121 determines No in Act 13 and returns to Act 12. Thus, the processor 121 repeats the processes in Act 12 and Act 13 until the termination notification or the error notification is received. The error notification is described later.

If the processor 121 receives the termination notification in the standby state in Act 12 and Act 13, the processor 121 determines Yes in Act 12 and proceeds to the process in Act 14.

In Act 14, the processor 121 cancels the operation restriction started in Act 11. After the process in Act 14, the processor 121 terminates the process shown in FIG. 4.

On the other hand, if the authentication of at least one toner cartridge 200 fails, the processor 111 of the authentication control section 110 determines No in Act 4 in FIG. 3 and proceeds to the process in Act 6.

In Act 6, the processor 111 generates the error notification and transmits it to the main control section 120. The error notification indicates that the authentication of at least one toner cartridge 200 fails. The error notification includes information indicating which one of the toner cartridges 200 fails in the authentication. The error notification is received by the processor 121 of the main control section 120. After terminating the process in Act 6, the processor 111 terminates the process shown in FIG. 3.

As described above, if the processor 111 determines that the length of the stop period is equal to or shorter than the threshold value A, the processor 111 skips the authentication process, and if it determines that the length of the stop period exceeds the threshold value A, the processor 111 performs the authentication process. The threshold value A is an example of a predetermined period of time. Therefore, by executing the process in Act 2, the processor 111 functions as a control section which skips the authentication process if it is determined that the stop period from the start of the operation stop to the end of the operation stop is equal to or shorter than the predetermined period of time, and executes the authentication process if it is determined that the stop period exceeds the predetermined period of time. Alternatively, by performing the process in Act 2, the computer having the processor 111 as the central part functions as the control section. Alternatively, by performing the process in Act 2, the authentication control section 110 functions as the control section. In the process in Act 2, the control section uses the temperature of the fixing section at the end of the operation stop to determine whether or not the stop period is equal to or shorter than the predetermined period of time.

On the other hand, if the processor 121 of the main control section 120 receives the error notification in the standby state in Act 12 and Act 13 in FIG. 4, the processor 121 determines Yes in Act 13 and proceeds to the process in Act 15.

In Act 15, the processor 121 controls each section of the image forming apparatus 100 to notify the error. For example, the processor 121 controls the touch panel of the operation panel 150 to display a screen indicating that the authentication of the toner cartridge 200 fails. The screen also includes an image indicating which one of the toner cartridges 200 fails in the authentication. For example, the processor 121 controls the communication section 125 to transmit information indicating that the authentication of the toner cartridge 200 fails and information indicating which one of the toner cartridges 200 fails in the authentication to the computer connected via the LAN or the like. After the process in Act 15, the processor 121 terminates the process shown in FIG. 4.

According to the first embodiment, the image forming apparatus 100 skips the authentication process on the toner cartridge 200 if the length of the stop period is equal to or shorter than the threshold value A. Then, the image forming apparatus 100 performs the authentication process on the toner cartridge 200 if the length of the stop period exceeds the threshold value A.

If the stop period is short, it is considered that the possibility of replacing the toner cartridge 200 is low. If the toner cartridge 200 is not replaced, the authentication is unnecessary. Therefore, by performing operations as described above, it is possible to prevent the unnecessary authentication process from being performed. It is also considered that if the image forming apparatus 100 does not perform the authentication process, the time until the various functions such as the printing function and the copying function can be used since the sleep mode is cancelled or the power supply is turned on becomes earlier, when compared with a case of performing the authentication process.

(Second Embodiment)

Since the configurations of the image forming apparatus 100 and the toner cartridge 200 according to the second embodiment are the same as those of the image forming apparatus 100 and the toner cartridge 200 shown in FIG. 1 and FIG. 2 according to the first embodiment, the description thereof is omitted.

Figure 5:
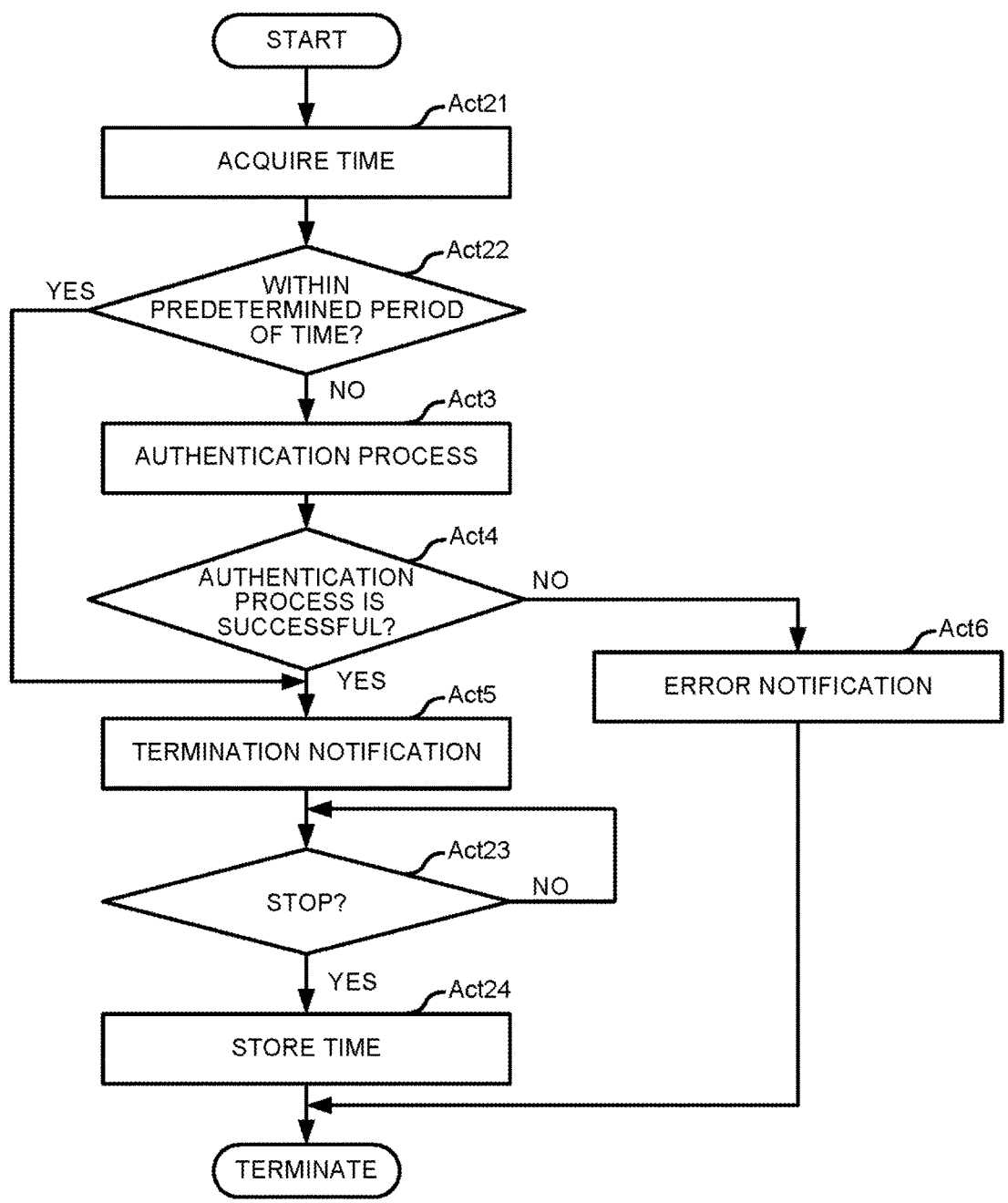
FIG. 5 is a flowchart for depicting a process by the processor of the authentication control section in FIG. 2 according to the second embodiment.

Hereinafter, the operation of the image forming apparatus 100 according to the second embodiment is described with reference to FIG. 4 and FIG. 5. The content of the process in the following operation description is merely an example, and various processes capable of achieving the same result can be suitably used. The ROM 112 or the auxiliary storage device 114 of the authentication control section 110 stores a program for realizing the process shown in FIG. 5 instead of the process in FIG. 3 according to the first embodiment. FIG. 5 is a flowchart for depicting the process by the processor 111 of the authentication control section 110. The processor 111 executes the process based on the program stored in the ROM 112 or the auxiliary storage device 114. In FIG. 5, processes the same as those in FIG. 3 are denoted with the same reference numerals. The ROM 122 or the auxiliary storage device 124 of the main control section 120 stores the program tor realizing the process shown in FIG. 4 in the same manner as in the first embodiment. Then, the processor 121 of the main control section 120 executes the process shown in FIG. 4 in the same manner as in the first embodiment. In the second embodiment, the description, of the same process as in the first embodiment may be omitted.

The processor 111 of the authentication control section 110 starts the process shown in FIG. 5 in response to the cancellation of the sleep mode of the image forming apparatus 100. The processor 111 also starts the process shown in FIG. 5 if the image forming apparatus 100 shifts from the power-off state to the power-on state.

In Act 21, the processor 111 acquires the current time from the RTC 126.

In Act 22, the processor 111 determines whether or not the length of the stop period is equal to or shorter than a threshold value C. Specifically, the processor 111 determines whether or not the elapsed time from the time stored in the auxiliary storage device 114 to the time acquired by the process in Act 21 is equal to or shorter than the threshold value C. The time stored in the auxiliary storage device 114 is a time just before the image forming apparatus 100 shifts to the sleep mode or a time just before the power supply is turned off. The process of storing the time in the auxiliary storage device 114 is described later. If no time is stored in the auxiliary storage device 114, the processor 111 regards that the length of the stop period exceeds the threshold value C. If the length of the stop period is equal to or shorter than the threshold value C, the processor 111 determines Yes in Act 22 and proceeds to the process in Act 5. On the other hand, in the length of the stop period exceeds the threshold value C, the processor 111 determines No in Act 22 and proceeds to the process in Act 3.

The threshold value C is an example of a predetermined period of time.

After the process in Act 5, the processor 111 proceeds to the process in Act 23.

In Act 23, the processor 111 stands by until the image forming apparatus 100 stop operating. Specifically, the processor 111 stands by until the image forming apparatus 100 shifts to the sleep mode or shifts to the power-off state. If the image forming apparatus 100 stops operating, the processor 111 determines Yes in Act 23 and proceeds to the process in Act 24.

The threshold value C is determined in advance by the designer or the seller of the image forming apparatus 100.

In Act 24, the processor 111 acquires the current time from the RTC 126. Then, the processor 111 stores the time in the auxiliary storage device 114. After the process in Act 24 or Act 6, the processor 111 terminates the process shown in FIG. 5. The process in Act 24 is performed, for example, immediately before the image forming apparatus 100 stops operating.

From the above, by executing the process in Act 22, the processor 111 functions as the control section. Alternatively, by executing the process in Act 22, the computer having the processor 111 as the central part functions as the control section. Alternatively, by performing the processing in Act 22, the authentication control section 110 functions as the control section.

According to the image forming apparatus 100 of the second embodiment, the same effect as in the first embodiment can be achieved.

Since the image forming apparatus 100 of the second embodiment measures the length of the stop period using the time, it is possible to measure the length of the stop period more accurately when compared with the first embodiment.

However, unlike the second embodiment, the image forming apparatus 100 of the first embodiment does not need to store the time. Therefore, the image forming apparatus 100 according to the first embodiment can cope with a case in which the time cannot be stored, such as when the power supply is suddenly turned off due to a power failure or the like.

(Third Embodiment)

Figure 6:
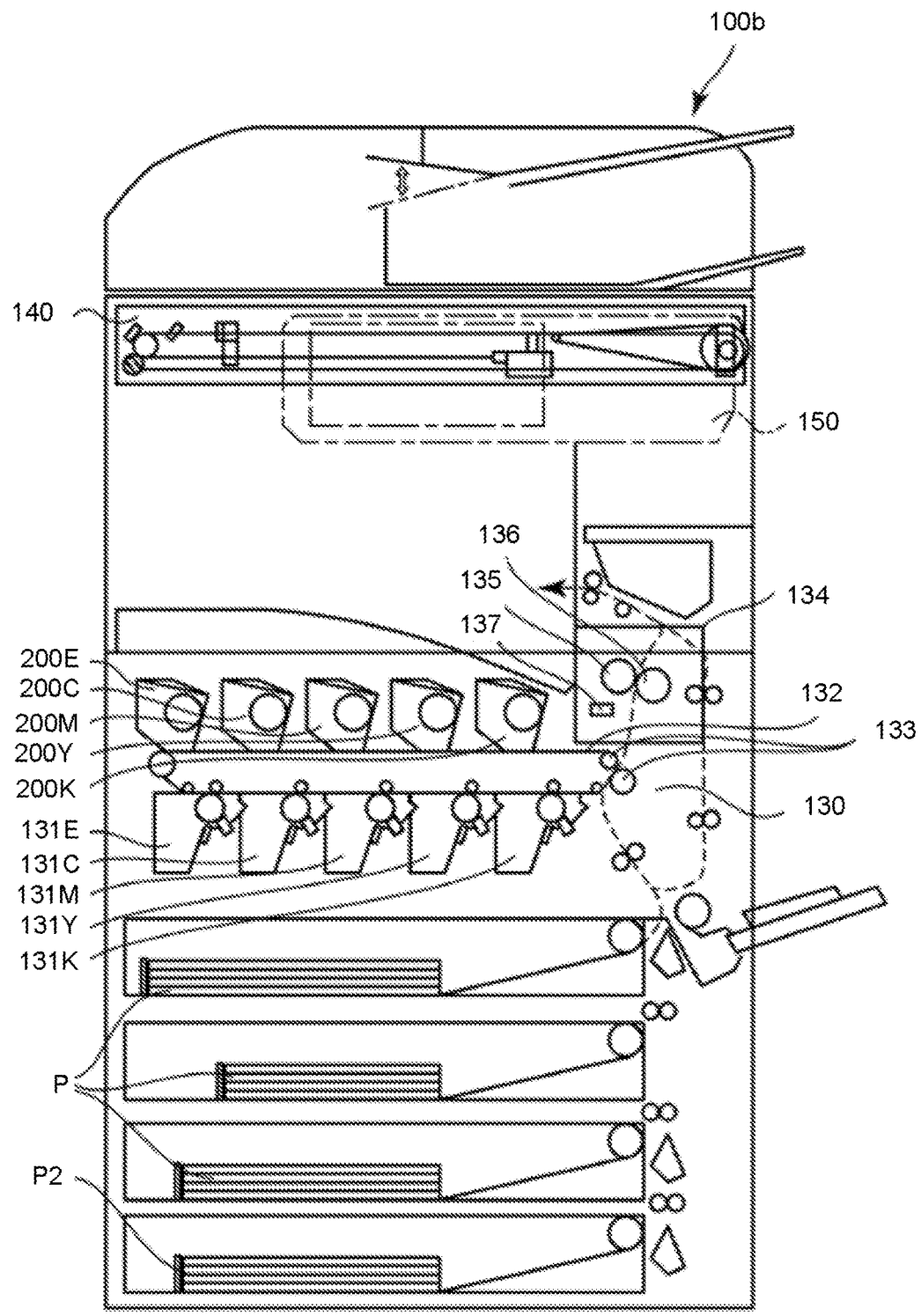
FIG. 6 is a schematic diagram illustrating an outline of an image forming apparatus according to the third embodiment.

FIG. 6 is a schematic diagram illustrating an outline of an image forming apparatus 100b according to the third embodiment. In FIG. 6, the components the same as those in FIG. 1 according to the first embodiment and the second embodiment are denoted by the same reference numerals as those in FIG. 1. In FIG. 6 according to the third embodiment, the description of the components the same as those in FIG. 1 according to the first embodiment and the second embodiment may be omitted.

The image forming apparatus 100b comprises an image forming section 131E in addition to the same components as the image forming apparatus 100. A toner cartridge 200E can be mounted in the image forming apparatus 100b. Therefore, as shown in FIG. 6, five toner cartridges 200, i.e., the toner cartridge 200C, the toner cartridge 200M, the toner cartridge 200Y, the toner cartridge 200K, and the toner cartridge 200E can be mounted in the image forming apparatus 100b.

The image forming section 131E forms an image to be transferred onto a sheet using a decolorable recording material. The decolorable recording material is decolored at a temperature higher than a predetermined temperature to become invisible.

The toner cartridge 200E stores a decolorable recording material. The recording material stored in the toner cartridge 200E is supplied to the image forming section 131E.

The image forming apparatus 100b has a non-decoloring printing function and a decoloring printing function as a printing function. The non-decoloring printing function is a function of forming an image on the image forming medium P using a normal recording material (hereinafter referred to as a "non-decolorable recording material") which is not decolorable. Therefore, the printing function of the image forming apparatus 100 according to the first embodiment and the second embodiment is the non-decoloring printing function. The decoloring printing function is a function of forming an image on the image forming medium P using the decolorable recording material. The image forming apparatus 100b sets the temperature of the heat roller 135 to a temperature suitable for fixing the decolorable recording material at the time of operation in the decoloring printing function. The temperature of the heat roller 135 in the decoloring printing function is hereinafter referred to as a "decoloring printing temperature". As an example, the decoloring printing temperature is different from the temperature of the heat roller 135 in the non-decoloring printing function. The temperature of the heat roller 135 in the non-decoloring printing function is hereinafter referred to as a "non-decoloring printing temperature".

The image forming apparatus 100b has a decoloring function for decoloring an image formed on the image forming medium P2. The image forming medium P2 is sheet-like paper on which an image is formed with the decolorable recording material. The image forming apparatus 100b heats the image forming medium P2 conveyed from the sheet feed cassette or the manual feed tray with the fixing section 134. As a result, the image formed with the decolorable recording material on the image forming medium P2 is decolored. The image forming apparatus 100b sets the temperature of the heat roller 135 to a temperature suitable for decoloring the decolorable recording material when operating in the decoloring function. The temperature of the heat roller 135 in the decoloring function is hereinafter referred to as a "decoloring temperature".

As an example, the decoloring printing temperature, the non-decoloring printing temperature and the decoloring temperature have a relation of (decoloring printing temperature)<(non-decoloring printing temperature)<(decoloring temperature).

The circuit configurations of the main portions of the image forming apparatus 100b and the toner cartridge 200 are the same as those of the image forming apparatus 100 and the toner cartridge 200 shown in FIG. 2 according to the first embodiment and the second embodiment, and thus, the description thereof is omitted.

Figure 7:
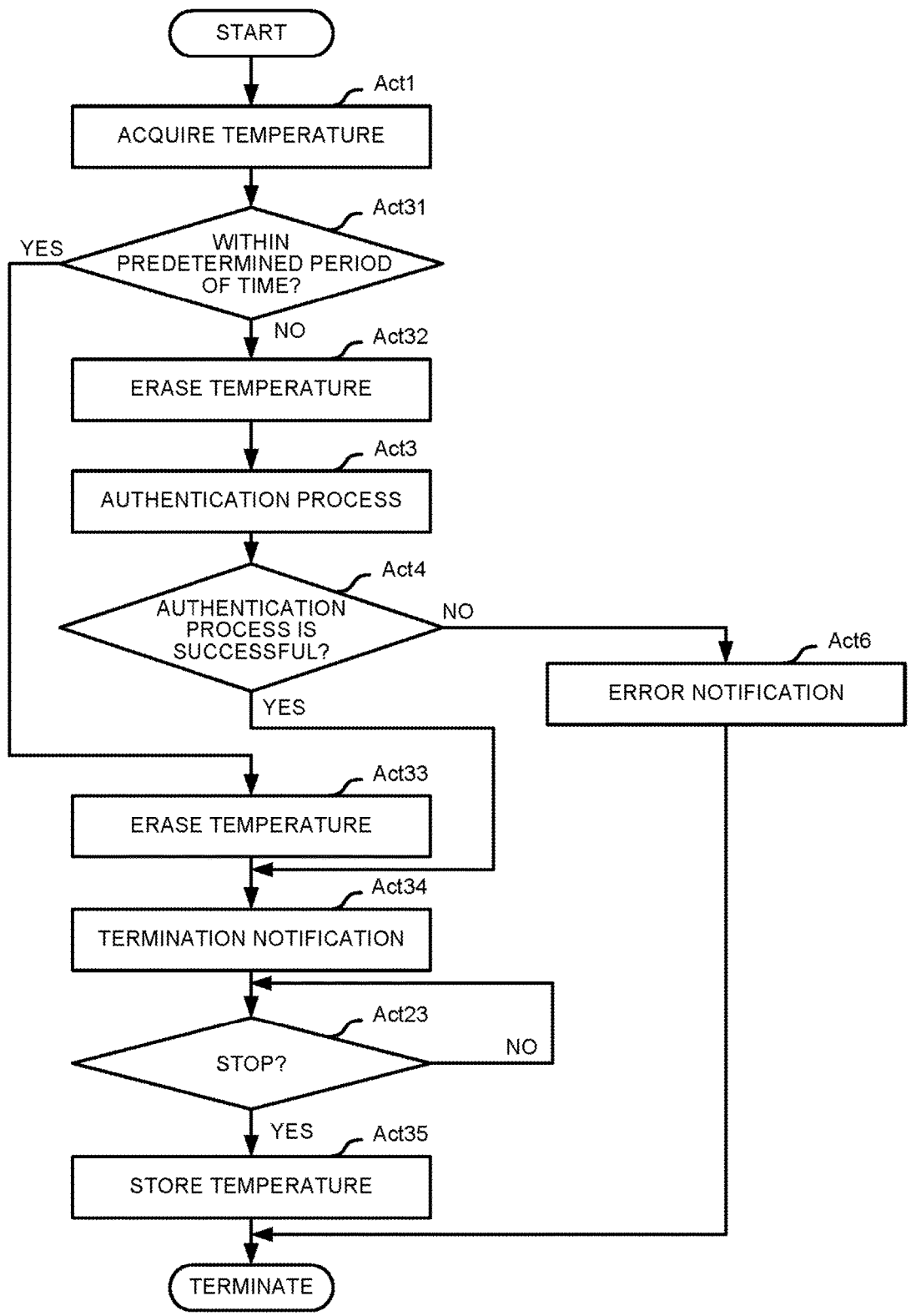
FIG. 7 is a flowchart for depicting a process by the processor of the authentication control section in FIG. 2 according to the third embodiment.

Hereinafter, the operation of the image forming apparatus 100b according to the third embodiment is described with reference to FIG. 4 and FIG. 7. The content of the process in the following operation description is merely an example, and various processes capable of achieving the same result can be suitably used. The ROM 112 or the auxiliary storage device 114 of the authentication control section 110 stores the program for realizing the process shown in FIG. 7 instead of FIG. 3 according to the first embodiment or FIG. 5 according to the second embodiment. FIG. 7 is a flowchart for depicting a process by the processor 111 of the authentication control section 110. The processor 111 executes the process based on the program stored in the ROM 112 or the auxiliary storage device 114. In FIG. 7, processes the same as those in FIG. 3 or FIG. 5 are denoted with the same reference numerals. The ROM 122 or the auxiliary storage device 124 of the main control section 120 stores a program for realizing the process shown in FIG. 4 as in the first embodiment and the second embodiment. Then, the processor 121 of the main control section 120 executes the process shown in FIG. 4 in the same manner as in the first embodiment and the second embodiment. In the third embodiment, description of processes the same as those in the first embodiment or the second embodiment may be omitted.

The processor 111 of the authentication control section 110 starts the process shown in FIG. 7 in response to the cancellation of the sleep mode of the image forming apparatus 100b. The processor 111 also starts the process shown in FIG. 7 if the image forming apparatus 100b shifts from the power-off state to the power-on state.

After the processing in Act 1 in FIG. 7, the processor 111 proceeds to the process in Act 31.

In Act 31, the processor 111 determines whether or not the length of the stop period is equal to or shorter than the threshold value A. In the third embodiment, similarly to the first embodiment, the fact that the temperature of the heat roller 135 end the temperature around the heat roller 135 gradually decrease during the stop period is used. For example, if a difference between the temperature acquired in Act 1 and the temperature stored in the auxiliary storage device 114 is equal to or smaller than a threshold value D, the processor 111 determines that the length of the stop period is equal to or shorter than the threshold value A. Alternatively, considering that the temperature decreases quickly as the temperature is high, the value of the threshold value D is increased as the temperature stored in the auxiliary storage device 114 becomes high. If no temperature is stored in the auxiliary storage device 114, the processor 111 regards that the length of the stop period exceeds the threshold value A. The temperature is stored in Act 35 described later.

If it is determined that the length of the stop period exceeds the threshold value A, the processor 111 determines No in Act 31 and proceeds to the process in Act 32.

In Act 32, the processor 111 erases the temperature stored in the auxiliary storage device 114. After the process in Act 32, the processor 111 proceeds to the process in Act 3.

If the length of the stop period is equal to or shorter than the threshold value A, the processor 111 determines Yes in Act 31 and proceeds to the process in Act 33.

In Act 33, the processor 111 erases the temperature stored in the auxiliary storage device 114.

If the processor 111 determines Yes in Act 4, the processor 111 proceeds to the process in Act 34. Further, after the process in Act 33, the processor 111 proceeds to the process in Act 34.

In Act 34, the processor 111 generates a termination notification and transmits it to the main control section 120. The termination notification indicates that the authentication of all the five toner cartridges 200 is successful, or that the authentication process is skipped. The termination notification is received by the processor 121 of the main control section 120. After the process in Act 34, the processor 111 proceeds to the process in Act 23.

It the processor 111 determines Yes in the process in Act 23, the process proceeds to the process in Act 35.

In Act 35, the processor 111 acquires the temperature output by the thermometer 137. Then, the processor 111 stores the temperature in the auxiliary storage device 114. After the process in Act 35 or Act 6, the processor 111 terminates the process shown in FIG. 7. The process in Act 35 is performed immediately before the image forming apparatus 100b stops operating, for example. The auxiliary storage device 114 for storing the temperature is an example of a storage section.

From the above, by performing the process in Act 31, the processor 111 functions as the control section. Alternatively, by executing the process in Act 31, the computer having the processor 111 as the central part functions as the control section. Alternatively, by performing the process in Act 31, the authentication control section 110 functions as the control section. In the process in Act 31, the control section uses the temperature of the fixing section at the end of the operation stop to determine whether or not the stop period is equal to or shorter than a predetermined period of time. Then, in the process in Act 31, if the difference between the temperature stored by the storage section and the temperature of the fixing section at the end of the operation stop is equal to or smaller than a predetermined value, the control section determines that the stop period is equal to or shorter than the predetermined period of time.

According to the image forming apparatus 100b of the third embodiment, the same effect as the image forming apparatus 100 of the first embodiment can be achieved.

The image forming apparatus 100b of the third embodiment stores the temperature at the start of the stop period and uses the temperature difference between the stored temperature and the temperature at the end of the stop period to determine whether or not the length of the stop period is equal to or shorter than threshold value A. Therefore, the image forming apparatus 100b of the third embodiment can determine whether or not the length of the stop period is equal to or shorter than the threshold value A more accurately when compared with the first embodiment in which the temperature at the start of the stop period is not stored. The image forming apparatus 100b changes the temperature of the heat roller 135 depending on the function. The image forming apparatus 100b of the third embodiment can cope with a case in which the temperature of the heat roller 135 varies depending on the function by storing the temperature at the start of the stop period.

(Fourth Embodiment)

Since the configurations of the image forming apparatus 100b and the toner cartridge 200 of the fourth embodiment are the same as those of the image forming apparatus 100b and the toner cartridge 200 shown in FIG. 2 and FIG. 6 according to the third embodiment, the description thereof is omitted.

The image forming apparatus 100b of the fourth embodiment changes the order of the authentication process on the toner cartridge 200 according to the function to foe executed. Therefore, first, types of the recording material used in respective functions are described.

The non-decoloring printing function of the image forming apparatus 100b is roughly divided into two types: a monochrome printing function using only the black recording material, and a color printing function using a plurality of recording material among cyan recording material, magenta recording material, yellow recording material and black recording material.

The types of the recording material used in the color printing function, the monochrome printing function, the decoloring printing function, the decoloring function, and the scanning function are as follows. C, M, Y, K and E represent the cyan recording material, the magenta recording material, the yellow recording material, the black recording material and the decolorable recording material, respectively.

Color printing function: at least one of cyan, magenta, yellow and black
Monochrome printing function: black
Decoloring printing function: decolorable recording material
Decoloring function: no recording material is used
Scanning function: no recording material is used The copy function includes the scanning function and any one of the monochrome printing function, the color printing function, and the decoloring printing function. At the time of receiving a facsimile, the facsimile function typically includes either one of the monochrome printing function and the decoloring printing function. Typically, the facsimile function does not use the recording material at the time of transmission.

Figure 8:
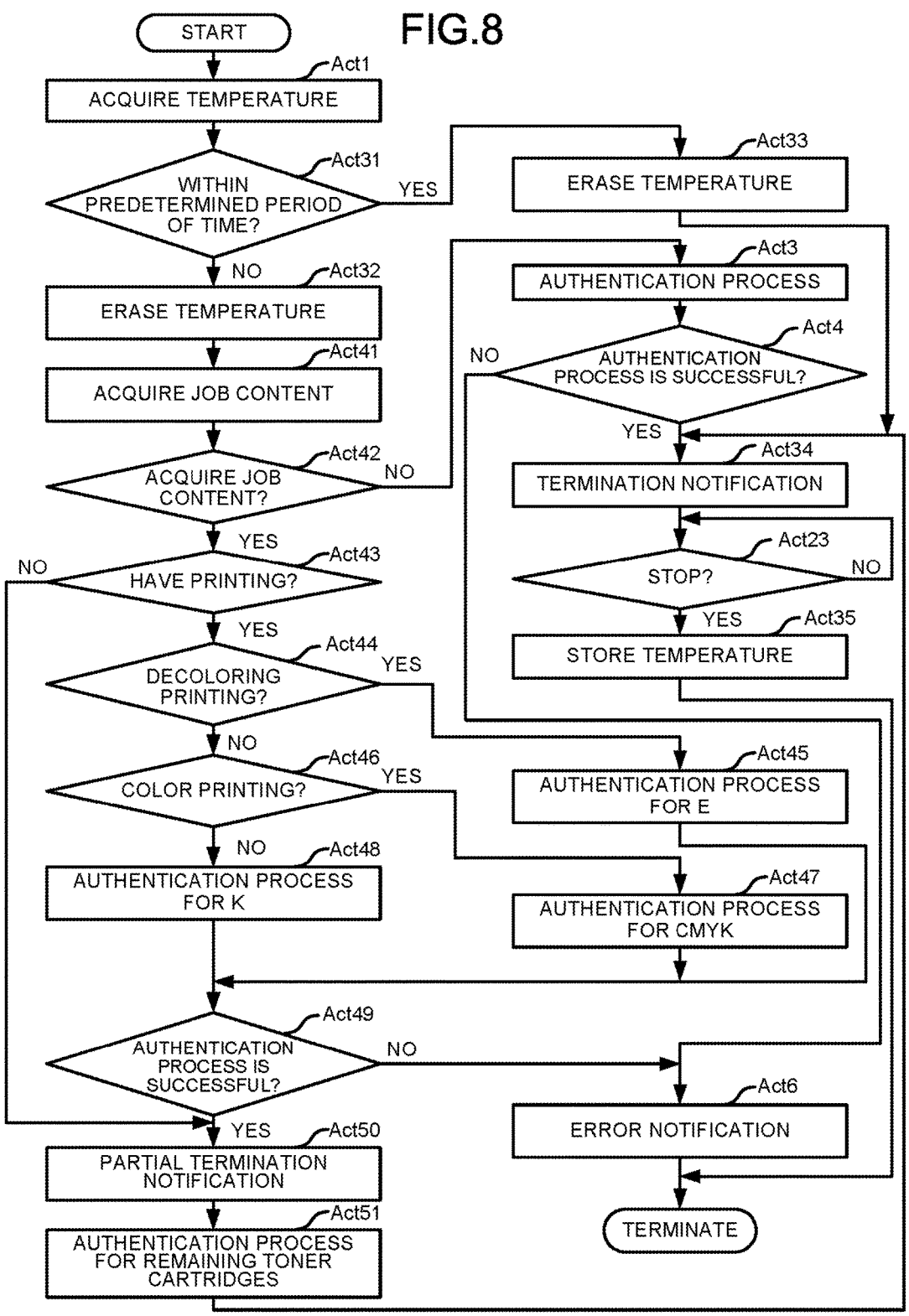
FIG. 8 is a flowchart for depicting a process by the processor of the authentication control section in FIG. 2 according to the fourth embodiment.
Figure 9:
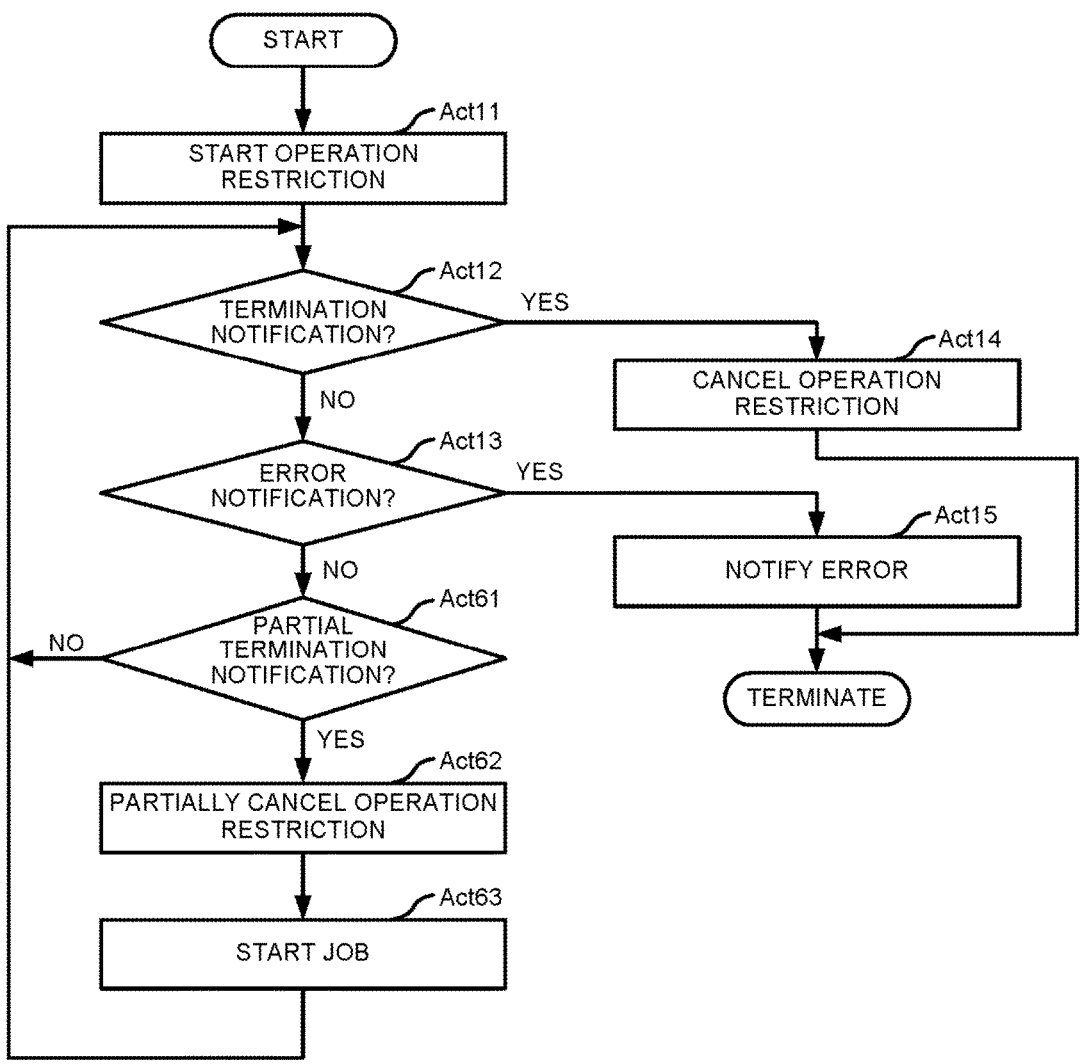
FIG. 9 is a flowchart for depicting a process by the processor of the main control section in FIG. 2 according to the fourth embodiment.

Hereinafter, the operation of the image forming apparatus 100b according to the fourth embodiment is described with reference to FIG. 8 and FIG. 9. The content of the process in the following operation description is merely an example, and various processes capable of achieving the same result can be suitably used. The ROM 112 or the auxiliary storage device 114 of the authentication control section 110 stores a program for realizing the process shown in FIG. 8 instead of FIG. 7 according to the third embodiment. FIG. 8 is a flowchart for depicting a process by the processor 111 of the authentication control section 110. The processor 111 executes the process based on the program stored in the ROM 112 or the auxiliary storage device 114. The ROM 122 or the auxiliary storage device 124 of the main control section 120 stores a program for realizing the process shown in FIG. 9 instead of FIG. 4 according to the first to third embodiments. FIG. 9 is a flowchart for depicting a process by the processor 121 of the main control section 120. The processor 121 executes the process based on the program stored in the ROM 122 or the auxiliary storage device 124. In the fourth embodiment, the description of the processes the same as in the third embodiment may be omitted.

The processor 111 of the authentication control section 110 starts the process shown in FIG. 8 in response to the cancellation of the sleep mode of the image forming apparatus 100b. The processor 111 also starts the process shown in FIG. 8 if the image forming apparatus 100b shifts from the power-off state to the power-on state.

The processor 111 on the authentication control section 110 proceeds to the process in Act 41 after the process in Act 32 in FIG. 8.

In Act 41, the processor 111 acquires information (hereinafter, referred to as "function information") indicating which function is used in a job to be executed next from the main control section 120. However, if there is no unexecuted job, the processor 111 does not acquire the function information. Alternatively, if there is no unexecuted job, since the main control section 120 cannot transmit the function information, the processor 111 fails to acquire the function information. The job indicates a content of the operation to be executed by the image forming apparatus 100b. For example, the job indicated by the function information acquired in Act 41 is input to the image forming apparatus 100b as the image forming apparatus 100b cancels the operation stop. Alternatively, the job indicated by the function information acquired in Act 41 is input to the image forming apparatus 100b immediately after the image forming apparatus 100b cancels the operation stop. For example, the job indicated by the function information acquired in the Act 41 is received from a PC or the like by the communication section 125 for the image forming apparatus 100b in the sleep mode. The sleep mode is canceled in response to the reception of the job by the communication section 125. Alternatively, the job indicated by the function information acquired in the Act 41 is received by the communication section 125 from the PC or the like as the image forming apparatus 100b shifts from the power-off state to the power-on state. Alternatively, the job indicated by the function information acquired in Act 41 may be input by an operator of the image forming apparatus 100b operating the operation panel 150 immediately after the image forming apparatus 100b cancels the operation stop. Alternatively, the job indicated by the function information acquired in the Act 41 may be automatically executed by the image forming apparatus 100b if a predetermined time elapses.

In Act 42, the processor 111 determines whether or not the function information is acquired in Act 41. If the function information is not acquired in Act 41, the processor 111 determines No in Act 42 and proceeds to the process in Act 3. On the other hand, if the processor 111 acquires the function information in Act 41, the processor 111 determines Yes in Act 42 and proceeds to the process in Act 43. If the processor 111 can acquire the function information in Act 41, it can be said that there is an unexecuted job in the image forming apparatus 100b. If the processor 111 cannot acquire the function information in the Act 41, it can be said that there is no unexecuted job in the image forming apparatus 100b.

In Act 43, the processor 111 refers to the function information acquired in Act 41 to determine whether or not the printing function is used. If the printing function is used, the processor 111 determines Yes in Act 43 and proceeds to the process in Act 44.

In Act 44, the processor 111 refers to the function information acquired in Act 41 to determine whether or not the decoloring printing function is used. If the decoloring printing function is used, the processor 111 determines Yes in Act 44 and proceeds to the process in Act 45.

In Act 45, the processor 111 performs the authentication process on the toner cartridge 200E.

On the other hand, if the decoloring printing function is not used, the processor 111 determines No in Act 44 and proceeds to the process in Act 46.

In Act 46, the processor 111 refers to the function information acquired in Act 41 to determine whether or not the color printing function is used. If the color printing function is used, the processor 111 determines Yes in Act 46 and proceeds to the process in Act 47.

In Act 47, the processor 111 performs the authentication process on the toner cartridge 200C, the toner cartridge 200M, the toner cartridge 200Y, and the toner cartridge 200K.

On the other hand, if the color printing function is not used, i.e., if the monochrome printing function is used, the processor 111 determines No in Act 46 and proceeds to the process in Act 48.

In Act 48, the processor 111 performs the authentication process on the toner cartridge 200K.

Through the above, by executing the processes in Act 43 to Act 48, the processor 111 functions as the control section for starting the authentication process on a replacement part determined to be used in the job to be executed prior to the authentication process on other replacement parts at the end of the operation stop. Alternatively, by executing the processes in Act 43 to Act 48, the computer having the processor 111 as the central part functions as the control section. Alternatively, by performing the processes in Act 43 to Act 48, the authentication control section 110 functions as the control section.

After the process in Act 45, Act 47 or Act 48, the processor 111 proceeds to the process in Act 49.

In Act 49, the processor 111 determines whether or not the authentication through the authentication process in Act 45, Act 47 or Act 48 is successful.

If the authentication is successful, the processor 111 determines Yes in Act 49 and proceeds to the process in Act 50. If the printing function is not used, the processor 111 determines No in Act 43 and proceeds to the process in Act 50. A case in which the printing function is not used refers to a case in which the function indicated by the function information acquired in the Act 41 is the scanning function or the decoloring function.

In Act 50, the processor 111 generates a partial completion notification and transmits it to the main control section 120. The partial completion notification indicates that the authentication of the toner cartridge 200 used in the function indicated by the function information is successful. If the processor 111 determines No in Act 43, the processor 111 does not perform the authentication process on any one of the toner cartridges 200. This is because in the function indicated by the function information acquired in Act 41, no toner is used. The partial completion notification includes at least one of the information indicating which one of the toner cartridges 200 is successfully authenticated, and the information indicating which one of the toner cartridges 200 has not completed the authentication yet.

On the other hand, the processor 121 of the main control section 120 starts the process shown in FIG. 9 in response to the cancellation of the sleep mode of the image forming apparatus 100b. The processor 121 also starts the process shown in FIG. 9 if the image forming apparatus 100b shifts from the power-off state to the power-on state.

If the processor 121 determines No in the process in Act 13 in FIG. 9, the processor 121 proceeds to the process in Act. 61.

In Act 61, the processor 121 determines whether or not the partial termination notification is received. If the processor 121 does not receive the partial termination notification, the processor 121 determines No in Act 61 and returns to the process in Act 12. Thus, the processor 121 repeats the processes in Act 12, Act 13, and Act 61 until the termination notification, the error notification or the partial completion notification is received.

If the processor 121 receives the partial termination notification in the standby state in Act 12, Act 13 and Act 61, the processor 121 determines Yes in Act 61 and proceeds to the process in Act 62.

In Act 62, the processor 121 partially cancels the operation restriction. Here, the operation restriction is canceled except for the toner cartridge 200 which does not complete the authentication as shown in the partial completion notification. As a result, the functions necessary for executing the job to be executed next can be used.

In Act 63, the processor 121 starts the unexecuted job. Incidentally, the processor 121 executes the control on the job execution in parallel with the process shown in FIG. 9 by, for example, a separate thread or another process. After the process in Act 63, the processor 121 returns to the process in Act 12.

On the other hand, in Act 51 in FIG. 8, the processor 111 of the authentication control section 110 performs the authentication process on the remaining toner cartridge 200. Specifically, the processor 111 performs the authentication process on the toner cartridge 200 other than the toner cartridge 200 on which the authentication process in Act 45, Act 47 or Act 48 is performed. The processor 111 proceeds to the process in Act 34 after the process in Act 51. Then, the termination notification transmitted by the process in Act 34 is received by the processor 121 of the main control section 120.

If the termination notification is received in the standby state in Act 12, Act 13 and Act 61 in FIG. 9, the processor 121 determines Yes in Act 12 and proceeds to the process in Act 14.

If the authentication of at least one toner cartridge 200 fails, the processor 111 of the authentication control section 110 determines No in Act 4 or Act 49 in FIG. 8 and proceeds to the process in Act 6. Then, the error notification transmitted by the process in Act 6 is received by the processor 121 of the main control section 120. After the process in Act 6 or Act 35, the processor 111 ends the process shown in FIG. 8.

If the error notification is received in the standby state in Act 12, Act 13 and Act 61 in FIG. 9, the processor 121 determines Yes in Act 13 and proceeds to the process in Act 15.

After the process in Act 14 or Act 15, the processor 121 terminates the process shown in FIG. 9.

According to the image forming apparatus 100b of the fourth embodiment, the same effect as that of the third embodiment can be achieved.

According to the image forming apparatus 100b of the fourth embodiment, if there is the job to be executed when the sleep mode is canceled or the power supply is turned on the authentication control section 110 performs the authentication process on the toner cartridge 200 corresponding to the toner to be used in the job prior to the authentication process on other toner cartridges 200. Then, the authentication control section 110 transmits the partial completion notification that indicates which one of the toner cartridges 200 is successfully authenticated to the main control section 120. As a result, the main control section 120 can use the function in which the toner corresponding to the toner cartridge 200 on which the authentication process is performed earlier is used. Therefore, the image forming apparatus 100b of the fourth embodiment can shorten the time until the start of the execution of the job as compared with the prior art.

According to the image forming apparatus 100b of the fourth embodiment, the authentication control section 110 first transmits the partial termination notification prior to the authentication process on the toner cartridge 200 if there is the job to be executed when the sleep mode is canceled or when the power supply is turned on and the job does not use the printing function. As a result, the main control section 120 receiving the partial completion notification can use each function in which the printing function is not used. Specifically, the main control section 120 can start executing various functions in which the printing function is not used without waiting for a result of the authentication of the toner cartridge 200. Therefore, the image forming apparatus 100b of the fourth embodiment can shorten the time until the start of the execution of the job as compared with the prior art.

According to the image forming apparatus 100b of the fourth embodiment, the authentication control section 110 performs the authentication process on the remaining toner cartridges 200 after sending the partial completion notification. Therefore, the authentication control section 110 can terminate the authentication process on the remaining toner cartridges 200 while the job is being executed.

The first to fourth embodiments may also be modified as follows.

The image forming apparatus 100 of the first embodiment and the second embodiment uses four types of the recording material corresponding to CMYK. However, the image forming apparatus 100 may form images corresponding to other colors. The number of the types of the recording material used by the image forming apparatus 100 may be smaller than four, or more than four. Likewise, the number of the types of the recording material used by the image forming apparatus 100b is not limited to five.

In the first to fourth embodiments, the image forming apparatus 100 or the image forming apparatus 100b performs the authentication on the toner cartridge 200. However, the image forming apparatus 100 or the image forming apparatus 100b is not limited to performing the authentication on the toner cartridge 200, and may perform authentication on a drum cartridge (photoconductive drum), a waste toner box, a fixing device or other replacement parts similarly to the toner cartridge 200.

The image forming apparatus 100 and the image forming apparatus 100b may not have the authentication control section 110. In this case, the main control section 120 performs the operations of both the authentication control section 110 and the main control section 120 shown in the first to fourth embodiments. In this case, the computer with the processor 121 as the central part operates as the authentication section.

The printing section 130 of the image forming apparatus 100b of the third embodiment is a laser printer. However, the printing section 130 of the image forming apparatus 100b of the third embodiment may be an inkjet printer. In this case, an ink inkjet cartridge instead of the toner cartridge 200 can be mounted in the image forming apparatus 100b. The image forming apparatus 100b then performs the authentication process on the inkjet cartridge. The inkjet cartridge stores ink as the recording material. In this case, the image forming apparatus 100b may perform the authentication process on an inkjet head, a waste ink tank or other replacement parts as well as the inkjet cartridge.

The printing functions of the image forming apparatus 100b of the fourth embodiment include the decoloring printing function, the color printing function, and the monochrome printing function. However, the printing functions of the image forming apparatus 100b are not limited to these three types. For example, the image forming apparatus 100b may include a monochrome printing function using any one of CMYK. For example, the image forming apparatus 100b may include a two-color printing function using any two of CMYK. The image forming apparatus 100b may have a function of performing printing using the decolorable recording material and at least one of CMYK. If one of the above functions is executed, the image forming apparatus 100b preferentially performs the authentication process on the toner cartridge 200 corresponding to the toner used in the function.

If the color printing function is executed, the image forming apparatus 100b of the fourth embodiment preferentially performs the authentication process on the toner cartridges 200 corresponding to four colors including CMYK in Act 47. However, in the color printing function, if there is a toner that is not used among the toners of four colors, the image forming apparatus 100b may perform the authentication process on the toner cartridges 200 corresponding to the toners to be used among the toners of four colors in Act 47. Then, the image forming apparatus 100b performs the authentication process in Act 51 on the toner cartridge 200 corresponding to the toner that is not used among the toners of four colors.

The image forming apparatus 100b of the fourth embodiment may not immediately perform the authentication process on the remaining toner cartridges 200. For example, after the process in Act 50 in FIG. 8, the processor 111 skips the process in Act 34 and proceeds to the process in Act 23. Then, if the image forming apparatus 100b executes a job using the remaining toner cartridges 200, the processor 111 performs the authentication of the remaining toner cartridge 200. In this case, the processor 111 also preferentially performs the authentication process on the toner cartridge 200 determined to be used in the job to be executed next.

The image forming apparatus 100b of the fourth embodiment may not perform the authentication process if there is no unexecuted job. Then, if the image forming apparatus 100b executes the job using the toner cartridge 200, the image forming apparatus 100b performs the authentication process on the toner cartridge 200 to be used in the job.

The image forming apparatus 100b of the fourth embodiment may preferentially perform the authentication process on the toner cartridge 200K used in the monochrome printing regardless of the presence or absence of the job if the color printing is prohibited by the administrator of the image forming apparatus 100b. This is because there is a high possibility that the printing to be executed next is the monochrome printing. Specifically, it can be said that the processor 111 determines that the toner cartridge 200K is used in a print job to be executed next and performs the authentication process thereon prior to the authentication process on other toner cartridges 200. The processor 111 acquires the information indicating whether or not the color printing is prohibited, for example from the main control section 120.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
   an image forming section configured to form an image on a sheet;
   a fixing section configured to heat the sheet;
   an authentication section configured to execute an authentication process on a replacement part; and
   a controller configured to control the heating operation of the fixing section, to skip the authentication process when determining that a stop period from the start of the heating operation stop to the end of the heating operation stop is equal to or shorter than a predetermined period of time, and to execute the authentication process when determining that the stop period exceeds the predetermined period of time.

2. The image forming apparatus according to claim 1, wherein the replacement part is one of a toner cartridge, an inkjet cartridge, an inkjet head or a waste ink tank.

3. The image forming apparatus according to claim 1, wherein the controller is configured to use an acquired time to determine whether or not the stop period is equal to or shorter than a predetermined period of time.

4. The image forming apparatus according to claim 1, wherein when the authentication is not successful, the controller is configured to issue an error notification.

5. The image forming apparatus according to claim 1, wherein when the authentication is successful, the controller is configured to issue a notification indicating that the authentication is successful.

6. The image forming apparatus according to claim 1, further comprising:
   a storage configured to store the temperature of the fixing section at the start of the heating operation stop, Wherein
   the controller is configured to determine that the stop period is equal to or shorter than a predetermined period of time when a difference between the temperature stored in the storage and the temperature of the fixing section at the end of the heating operation stop is equal to or smaller than a predetermined value.

7. An image forming apparatus, comprising:
   an image forming section configured to form an image on a sheet;
   a fixing section configured to heat the sheet:
   an authentication section configured to execute an authentication process on a plurality of replacement parts used in the image forming section: and
   a controller configured to control the heating operation of the fixing section, to start the authentication process on the replacement part determined to be used in a job to be executed at the end of the heating operation stop prior to the authentication process on other replacement parts determined not to be used in the job.

8. A control method, comprising:
   performing a heat operation, via a fixing section, to heat a sheet;
   controlling the heating operation, to skip an authentication process on a replacement part when it is determined that a stop period from the start of the heating operation stop to the end of the heating operation stop is equal to or shorter than a predetermined period of time, and executing the authentication process when it is determined that the stop period exceeds the predetermined period of time.

9. The control method of claim 8, wherein determining whether or not the stop period is equal to or shorter than a predetermined period of time is based on an acquired time.

10. The control method of claim 8, further comprising storing the temperature of the fixing section at the start of the heating operation stop,
   wherein it is determined that the stop period is equal to or shorter than a predetermined period of time when a difference between the stored temperature and the temperature of the fixing section at the end of the heating operation stop is equal to or smaller than a predetermined value.

11. The control method of claim 8, further comprising: when the authentication is not successful, issuing an error notification.

12. The control method of claim 8, further comprising: when the authentication is successful, issuing a notification indicating that the authentication is successful.

13. A control method, comprising:
   forming an image on a sheet via an image forming section;
   performing a heating operation, via a fixing section, to heat the sheet;
   executing an authentication process on a plurality of replacement parts used in the image forming section; and
   controlling the heating operation of the fixing section, to start the authentication process on the replacement part determined to be used in a job to be executed at the end of a heating operation stop prior to the authentication process on other replacement parts determined not to be used in the job.

* * * * *